United States Patent
Chung

(10) Patent No.: US 9,893,601 B2
(45) Date of Patent: Feb. 13, 2018

(54) BRUSH PLATE

(71) Applicant: Johnson Electric S.A., Murten (CH)

(72) Inventor: Ming Yau Chung, Hong Kong (CN)

(73) Assignee: Johnson Electric S.A., Murten (CH)

( * ) Notice: Subject to any disclaimer, the term of this patent is extended or adjusted under 35 U.S.C. 154(b) by 260 days.

(21) Appl. No.: 14/704,545

(22) Filed: May 5, 2015

(65) Prior Publication Data

US 2015/0318767 A1    Nov. 5, 2015

(30) Foreign Application Priority Data

May 5, 2014  (CN) .......................... 2014 1 0188780

(51) Int. Cl.
| | |
|---|---|
| H01R 39/36 | (2006.01) |
| H02K 11/02 | (2016.01) |
| H02K 13/00 | (2006.01) |
| H02K 11/27 | (2016.01) |
| H02K 5/14 | (2006.01) |

(52) U.S. Cl.
CPC ............. *H02K 13/00* (2013.01); *H01R 39/36* (2013.01); *H02K 11/02* (2013.01); *H02K 11/27* (2016.01); *H02K 5/148* (2013.01)

(58) Field of Classification Search
CPC ........ H02K 13/00; H02K 11/27; H02K 11/02; H02K 5/148; H01R 39/36
USPC ............................ 310/68 C, 71, 72, 239–253
See application file for complete search history.

(56) References Cited

U.S. PATENT DOCUMENTS

| | | | | |
|---|---|---|---|---|
| 2,828,390 | A | * | 3/1958 | McAlister .......... H01H 85/0458 29/623 |
| 5,294,852 | A | * | 3/1994 | Straker .................. H02K 11/25 310/239 |
| 5,854,583 | A | * | 12/1998 | Falchetti .............. H01H 85/044 337/159 |
| 7,659,801 | B2 | * | 2/2010 | Kusumoto ............ F02N 11/087 335/126 |
| 8,786,160 | B2 | * | 7/2014 | Migliarelli ............. H02K 5/148 310/239 |
| 2005/0141164 | A1 | * | 6/2005 | Bender ................ H01H 69/022 361/104 |
| 2008/0084133 | A1 | * | 4/2008 | Burton ................... H01R 39/26 310/239 |

(Continued)

FOREIGN PATENT DOCUMENTS

| | | |
|---|---|---|
| CN | 201270232 Y | 7/2009 |
| WO | WO 2006/010862 A1 | 2/2006 |
| WO | WO 2010003909 * | 1/2010 |

*Primary Examiner* — Bernard Rojas
*Assistant Examiner* — Ahmed Elnakib
(74) *Attorney, Agent, or Firm* — Muncy, Geissler, Olds & Lowe, P.C.

(57) ABSTRACT

A brush plate has an insulating substrate, at least one pair of brushes mounted on the insulating substrate, and a conductor for supplying power to the brushes. The conductor includes at least one overheat protection portion having a smaller cross sectional area than adjacent portions of the conductor. By integrally forming the overheat protection portions on the conductors, no extra overheat protection device is required. Preferably, the overheat protection portion has a bent structure. The bent structure may be U-shape, Z-shape, M-shape or wave-shape. The bent structure can increase the anti-shock capability of the conductor and shorten the response time of the overheat protection portion.

3 Claims, 3 Drawing Sheets

(56) References Cited

U.S. PATENT DOCUMENTS

| | | | | |
|---|---|---|---|---|
| 2009/0072656 A1* | 3/2009 | Eisert | ............... | H01R 39/26 310/244 |
| 2011/0187225 A1* | 8/2011 | Bayer | ............ | H01R 39/385 310/245 |
| 2012/0080962 A1* | 4/2012 | Migliarelli | ......... | H02K 5/148 310/43 |
| 2015/0372560 A1* | 12/2015 | Liang | ............ | H02K 5/24 310/71 |

* cited by examiner

BRUSH PLATE

CROSS REFERENCE TO RELATED APPLICATIONS

This non-provisional patent application claims priority under 35 U.S.C. § 119(a) from Patent Application No. 201410188780.7 filed in The People's Republic of China on May 5, 2014, the entire contents of which are hereby incorporated by reference.

FIELD OF THE INVENTION

This invention relates to a brush plate and in particular, to a brush plate with overheat protection for a brush motor.

BACKGROUND OF THE INVENTION

A brush plate of a brush motor typically includes brushes, a plurality of other electrical components, and conductors for supplying power to the brushes and electrical components. Overheat protection devices may be connected between the conductors and the brushes, or between the conductors and other electrical components to prevent overly large currents from flowing through the motor which would damage the motor. In a typical example of such a brush plate, the overheat protection device includes a resilient strip as shown in FIG. 6. One end of the resilient strip is connected to the circuit by a solder joint. When the current is overly large, or the heat inside the motor is too high, the solder of the solder joint melts, which allows the resilient strip to pop up thus breaking the circuit. However, in this type of overheat protection device, the solder joint has a poor reliability. The solder may release the strip due to shock or corrosion during use, which would cause the motor to malfunction. In addition, the various solder materials used have a narrow melting range, which results in such devices only being suitable for a limited range of operating conditions.

Hence, there is a desire for a brush plate with an improved overheat protection function for a brush motor.

SUMMARY OF THE INVENTION

Accordingly, in one aspect thereof, the present invention provides a brush plate for a brush type electric motor, comprising: an insulating substrate; at least one pair of brushes mounted on the insulating substrate, and a conductor fixed with the insulating substrate for supplying power to the brushes, wherein the conductor comprises a overheat protection portion having a thickness smaller than the thickness of adjacent portions of the conductor.

Preferably, the overheat protection portion comprises a bent structure.

Preferably, the bent structure has one of a U-shape, Z-shape, M-shape and wave-shape.

Preferably, the bent structure comprises a plurality of continuous curved portions.

Preferably, the conductor comprises a plurality of the overheat protection portions.

Preferably, the conductor is in the form of a strip, the insulating substrate includes a recess and a plurality of resilient latches at opposite sides of the recess, the conductor is received in the recess, and the resilient latches press opposite sides of the conductor to prevent the conductor from slipping out of the recess.

Alternatively, the conductor is in the form of a strip, the insulating substrate is a molded part molded to the conductor and having at least one recess through which the conductor is exposed.

Preferably, the brushes are arranged such that there are two pairs of adjacent brushes of opposite polarity and two pairs of adjacent brushes of the same polarity, and an angle formed between the brushes of each pair of brushes of opposite polarity is less than an angle formed between the brushes of each pair of brushes of the same polarity.

Preferably, the number of conductors is two, each connected to a corresponding one of positive and negative power leads, each conductor comprises a first conductor section and a second conductor section, each first conductor section is disposed between one pair of the two pairs of brushes of opposite polarity, each second conductor section is disposed between the brushes of a respective pair of the two pairs of adjacent brushes with the same polarity, a distal end of the first conductor section remote from the second conductor section is connected with a corresponding power lead, and the second conductor section is greater in length than the first conductor section.

Preferably, the brush plate further comprises inductors mounted on the insulating substrate and electrically connected with the conductors, the inductors extending in a plane parallel to a plane of the insulating substrate.

Preferably, each of the inductors is disposed at a radially outer side of the second conductor section of a respective corresponding conductor.

According to a second aspect, the present invention provides a brush type electric motor incorporating a brush plate as described above.

In the brush plate as exemplified above, by integrally forming the overheat protection portions with the conductors of the brush plate, no extra overheat protection device is required, which can thus avoid the poor connection problem between the overheat protection device and other electrical components. In addition, in comparison with the conventional practice that the overheat protection device must be disposed close to the hottest area of the motor, the overheat protection portion of the present invention can be flexibly disposed at any portion of the conductor. The U-shaped, Z-shaped or M-shaped bent structure of the overheat protection portion can increase the anti-shock capability of the conductor. The bent structure is also advantageous in concentrating the heat thus shortening the response time of the overheat protection portion. In addition, this structure allows the overheat protection portion to be tailored to the specific operating temperature required by the motor by adjusting the features of the overheat protection portion, such as length and cross sectional area.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
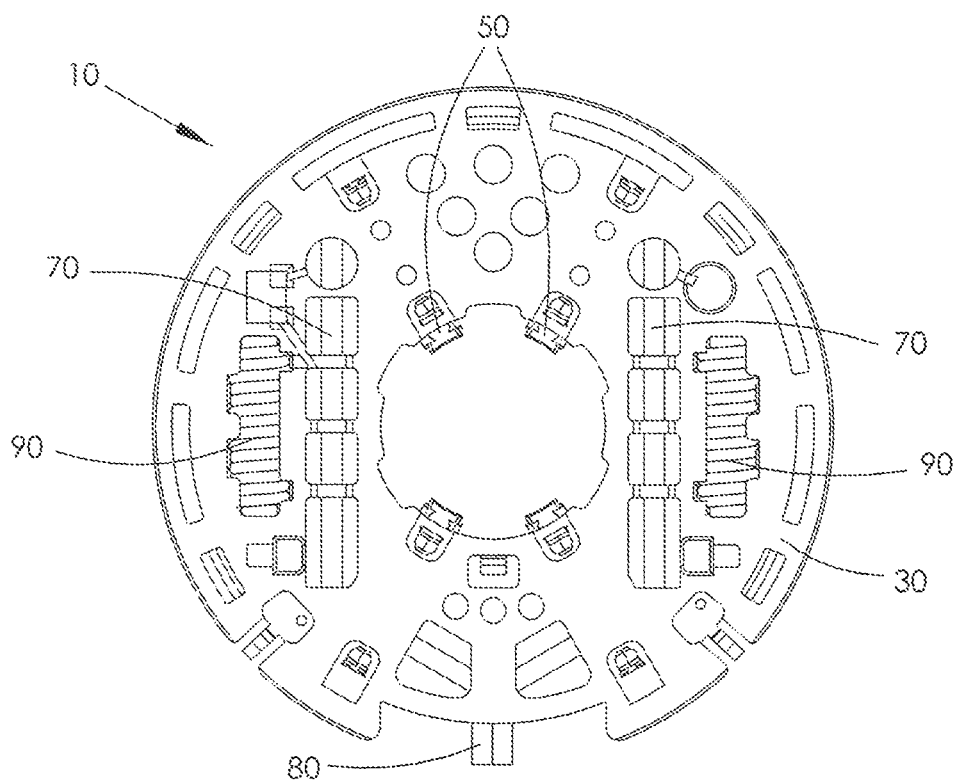
FIG. 1 illustrates a brush plate according to a preferred embodiment of the present invention.
Figure 2:
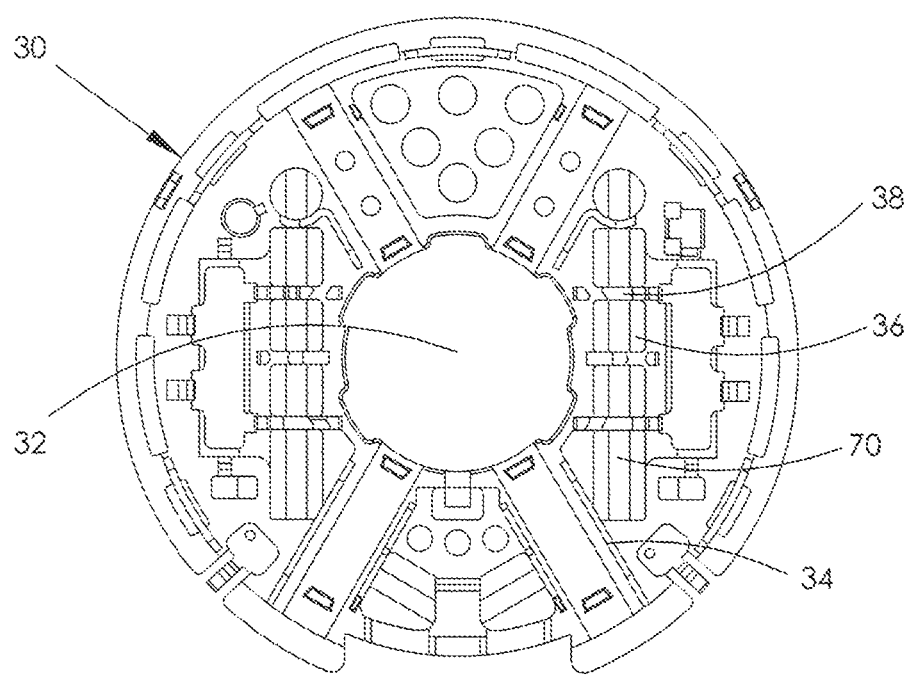
FIG. 2 illustrates the other side of the brush plate of FIG. 1, with various components removed for clarity.

FIG. 1 is a plan view of a brush plate according to one embodiment of the present invention. FIG. 2 is a view of the other side of the brush plate of FIG. 1, with various components removed such as brushes, inductors and power leads.

The brush plate 10 can be used to supply power to the rotor of a brush motor. The brush plate includes an insulating substrate 30, a plurality of brushes 50 mounted on the insulating substrate 30, and a plurality of conductors 70 fixed to the insulating substrate 30 for supplying power to the brushes 50.

The insulating substrate 30 has a generally circular shape. Depending on the shape of a motor end cover, the insulating substrate 30 may also have another shape such as square shape. The insulating substrate 30 defines a central through hole 32 for allowing insertion of a commutator of the motor. Segments of the commutator are electrically connected with windings of the rotor. A plurality of brush holders 34 is disposed around the through hole 32. In the present embodiment, the brush holders are brush cages.

Each brush 50 is mounted in a corresponding one of the brush mounting brackets 34. A resilient member is disposed between a distal end (the end remote from the through hole 32 of the insulating substrate 30) of each brush 50 and the corresponding brush mounting bracket 34. Under the biasing force of the resilient member, one end of each brush 50 opposite the distal end (the end proximate to the through hole 32 of the insulating substrate 30, also referred to as a contact end) is urged out of the brush mounting bracket 34 into sliding contact with the commutator.

The conductors 70 are mounted on one side of the insulating substrate 30, for connecting the brushes 50 to power leads 80 of the motor that are to be connected with an external power source. In the present invention, each conductor 70 includes at least one portion 76 that has a thickness smaller than the thickness of adjacent portions. The at least one portion with a smaller thickness forms an overheat protection portion. When an electrical current flowing through the overheat protection portion is greater than a preset value, which means the motor circuit has a higher-than-normal thermal load, the overheat protection portion melts thus breaking the motor circuit. Therefore, the conductors 70 of the present invention have both the electrically conducting function and overheat protection function, and additional components for overheat protection are thus no longer required.

Preferably, the conductor 70 is in the form of a strip, preferably a copper strip. The insulating substrate 30 includes a recess 36 and a plurality of resilient latches 38 at opposite sides of the recess 36. The conductor 70 is received in the recess 36, and the resilient latches 38 resiliently press opposite sides of the conductor 70 to prevent the conductor 70 from slipping out of the recess 36.

Alternatively, the conductors 70 may be insert molded in the substrate 30 with recesses arranged to expose the conductors at desired locations. Strips, corresponding to the latches, may be provided to support the conductors within large recesses.

In the present embodiment, the number of brushes 50 is four. A 60-degree angle is formed between each pair of adjacent positive and negative brushes, and a 120-degree angle is formed between two adjacent brushes with the same polarity. The number of conductors 70 is two, each connected to a corresponding one of the positive and negative power leads 80. Each conductor 70 generally has an L-shape including two conductor sections 72, 74. The first conductor section 72 is disposed between one pair of the positive and negative brushes 50. The second conductor section 74 is disposed between two adjacent brushes 50 with the same polarity. The first conductor section 72 is less than the second conductor section 74 in length. A distal end of the first conductor section 72 remote from the second conductor section 74 is connected with one corresponding power lead 80. The brushes 50 and other electrical components (e.g. inductor and/or capacitor) may be mechanically connected to their respective conductors 70 directly or indirectly, thus establishing electrical connection with the conductors 70. The preferred connection method is spot welding.

Preferably, the overheat protection portion of the conductor 70 is in the form of a bent structure 76. The bent structure may be formed in the first conductor section, in the second conductor section or both. The number of bent structures 76 may be one or more depending on actual requirements. The bent structure 76 can increase the anti-shock capability of the conductor 70. With more bent structures provided, the anti-shock capability is made higher and the heat is generated faster.

Figure 3:
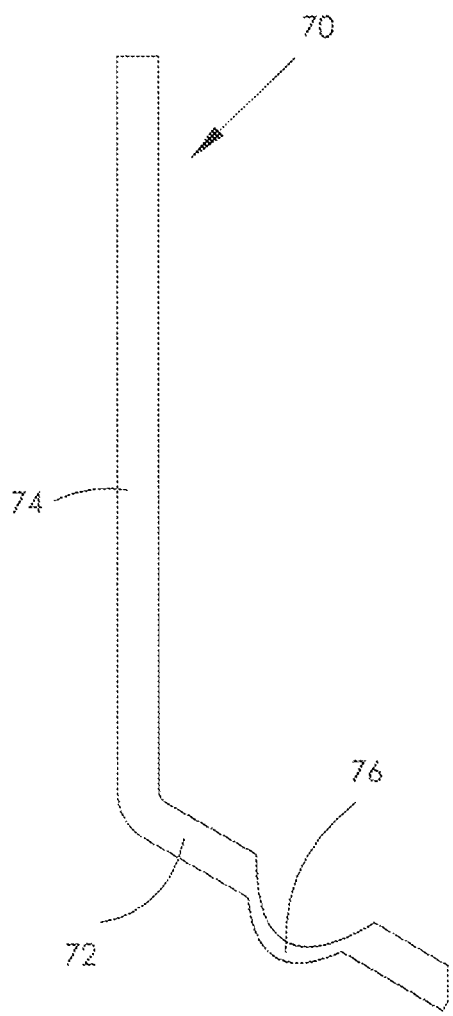
FIG. 3 illustrates a conductor of the brush plate of FIG. 1.

In the embodiment of FIG. 3, the bent structure 76 is U-shaped and shown formed in the first conductor section 72.

Figure 4:
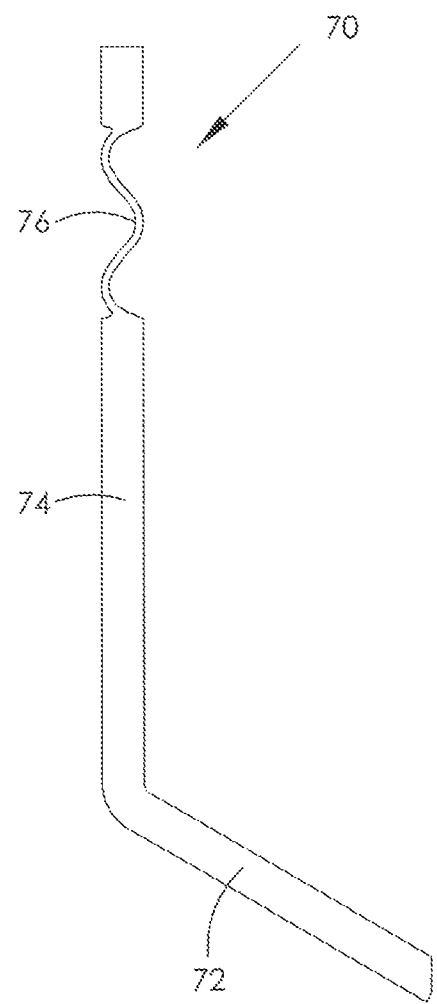
FIG. 4 illustrates a conductor according to another embodiment.

In the embodiment of FIG. 4, the bent structure 76 is M-shaped and shown formed in the second conductor section 74.

Figure 5:
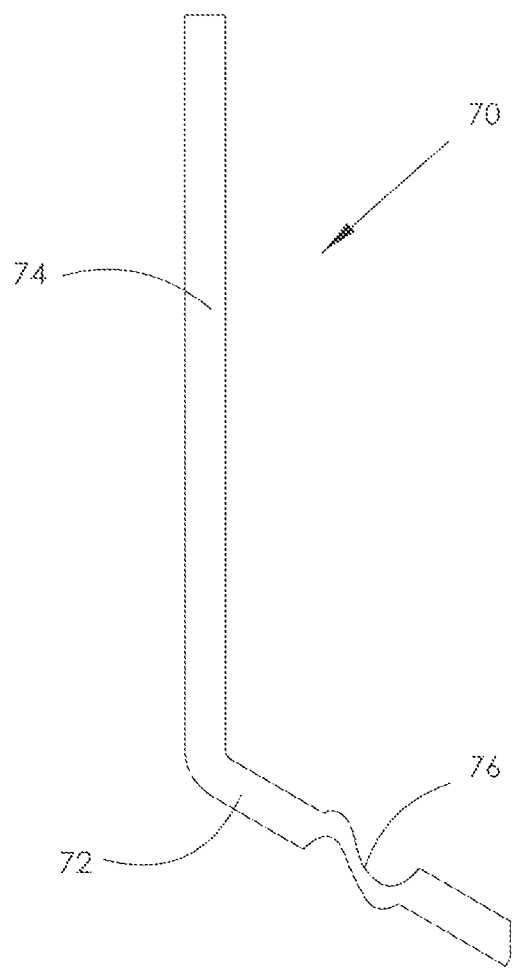
FIG. 5 illustrates a conductor according to a further embodiment.
Figure 6:
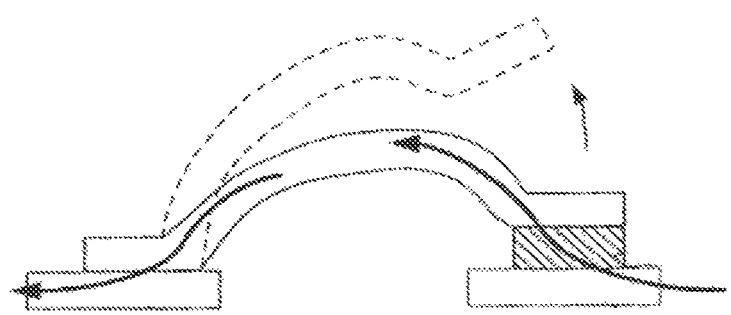
FIG. 6 is a side view of a prior art overheat protection device.

In the embodiment of FIG. 5, the bent structure 76 is Z-shaped and shown formed in the first conductor section 72.

It should be understood that the bent structure of the overheat protection portion of the conductor 70 may be of another shape such as a wave shape. The bent structure may include one curved portion. For example, the U-shaped bent structure includes one curved portion. The bent structure may also include a plurality of curved structures. For example, the Z-shaped bent structure includes two curved portions, the M-shaped bent structure includes three curved portions, and the wave-shaped bent structure may include more than three curved portions.

In comparison with the conventional practice that the overheat protection device must be disposed close to the hottest area of the motor, the overheat protection portion of the present invention may be flexibly disposed at any portion of the conductor.

Referring to FIG. 1, the brush plate 10 further includes inductors 90 mounted on the insulating substrate 30, which are electrically connected with the conductors 70. Preferably, the inductors 90 lay down on the insulating substrate 30, i.e. the longitudinal direction of each inductor 90 is parallel to the insulating substrate 30. In this embodiment, each inductor 90 is disposed in an area between two brushes 50 having the same polarity, substantially parallel to and on a radially outer side of the second conductor section 74 of a corresponding conductor 70.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A brush plate for a brush type electric motor, comprising:
   an insulating substrate;
   at least one pair of brushes mounted on the insulating substrate;
   a first conductor fixed with the insulating substrate for supplying power to the brushes; and
   a second conductor;
   wherein the first conductor comprises a overheat protection portion having a smaller cross sectional area than adjacent portions of the first conductor;
   wherein each of the first conductor and the second conductor is connected to a corresponding one of positive and negative power leads, each of the first conductor and the second conductor comprises a first conductor section and a second conductor section, each first conductor section is disposed between one pair of the two pairs of brushes of opposite polarity, each second conductor section is disposed between the brushes of a respective pair of the two pairs of adjacent brushes with the same polarity, a distal end of the first conductor section remote from the second conductor section is connected with a corresponding power lead, and the second conductor section is greater in length than the first conductor section.

2. The brush plate of claim 1, wherein the brush plate further comprises inductors mounted on the insulating substrate and electrically connected with the first conductor and the second conductor, the inductors extending in a plane parallel to a plane of the insulating substrate.

3. The brush plate of claim 2, wherein each of the inductors is disposed at a radially outer side of the second conductor section of a respective corresponding one of the first conductor and the second conductor.

* * * * *